United States Patent
Cloward et al.

(10) Patent No.: US 8,701,047 B2
(45) Date of Patent: Apr. 15, 2014

(54) CONFIGURATION CREATION FOR DEPLOYMENT AND MONITORING

(75) Inventors: Thomas Cloward, Snoqualmie, WA (US); Xiaoxi Tan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 12/353,881

(22) Filed: Jan. 14, 2009

(65) Prior Publication Data

US 2010/0180221 A1 Jul. 15, 2010

(51) Int. Cl.
G06F 3/048 (2013.01)

(52) U.S. Cl.
USPC .......................................................... 715/853

(58) Field of Classification Search
USPC ......................................... 715/741, 742, 743
See application file for complete search history.

(56) References Cited

U.S. PATENT DOCUMENTS

| | | | |
|---|---|---|---|
| 5,732,397 A | 3/1998 | DeTore et al. | |
| 6,708,155 B1 | 3/2004 | Honarvar et al. | |
| 8,166,071 B1* | 4/2012 | Korablev et al. | 707/783 |
| 2002/0095592 A1* | 7/2002 | Daniell et al. | 713/200 |
| 2003/0144877 A1* | 7/2003 | Goldmann et al. | 705/2 |
| 2004/0103058 A1 | 5/2004 | Hamilton | |
| 2004/0181441 A1 | 9/2004 | Fung et al. | |
| 2006/0075465 A1 | 4/2006 | Ramanathan et al. | |
| 2006/0184482 A1 | 8/2006 | Flinn et al. | |
| 2007/0124797 A1* | 5/2007 | Gupta et al. | 726/1 |
| 2007/0156670 A1 | 7/2007 | Lim | |
| 2008/0033809 A1* | 2/2008 | Black et al. | 705/14 |
| 2009/0094294 A1* | 4/2009 | Morris et al. | 707/202 |
| 2011/0143730 A1* | 6/2011 | Zaffino et al. | 455/414.1 |

OTHER PUBLICATIONS

"Decision Optimizer", Retrieved at<<http://www.fairisaac.com/ficx/Products/dmtools/Decision-Optimizer.html>>, Nov. 18, 2008, p. 1.

"PREDIGY 5.0 and IR Discover 1.6", Retrieved at<<http://www.intelligentresults.com/docroot/pdfs/PREDIGY_5_Specs_LR_Sep07.pdf>>, pp. 2.

* cited by examiner

Primary Examiner — William Bashore
Assistant Examiner — Rayeez Chowdhury
(74) Attorney, Agent, or Firm — Jim Sfekas; Kate Drakos; Micky Minhas

(57) ABSTRACT

A configuration management and monitoring system may use a hierarchical knowledge base to identify configuration settings, resolve conflicts between configuration settings, and implement and monitor the configuration settings for one or more devices in a network environment. The system may produce a file that may be consumed by an application and with which the application may be configured to conform to the configuration settings. The system may also produce a set of settings that may be used to automate deployment and monitor compliance with the settings.

20 Claims, 2 Drawing Sheets

CONFIGURATION CREATION FOR DEPLOYMENT AND MONITORING

BACKGROUND

The configuration of computer systems is a very complex task, especially in an enterprise with many different servers, client devices, network devices, and peripherals. Within the enterprise, different goals or applications may have conflicting requests for certain settings or resources. In some server operating systems, for example, several hundred settings within the server may affect the security configuration of the server.

An information technologies professional may be responsible for making sense of the various settings and configuring the devices to meet a company's goals for usability and for other, often conflicting goals.

In a security related example, security settings may compromise usability. For example, an application may use a set of interface ports for communicating with devices on the Internet. When certain ports are open, a server may be vulnerable to attacks. The information technologies professional may balance the security goals with the operability goals of the application.

The sheer number of configuration options for operating systems and the many different applications that execute on each device may make selecting and configuring the options overwhelming to even knowledgeable experts in the field.

SUMMARY

A configuration management and monitoring system may use a hierarchical knowledge base to identify configuration settings, resolve conflicts between configuration settings, and implement and monitor the configuration settings for one or more devices in a network environment. The system may produce a file that may be consumed by an application and with which the application may be configured to conform to the configuration settings. The system may also produce a set of settings that may be used to automate deployment and monitor compliance with the settings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
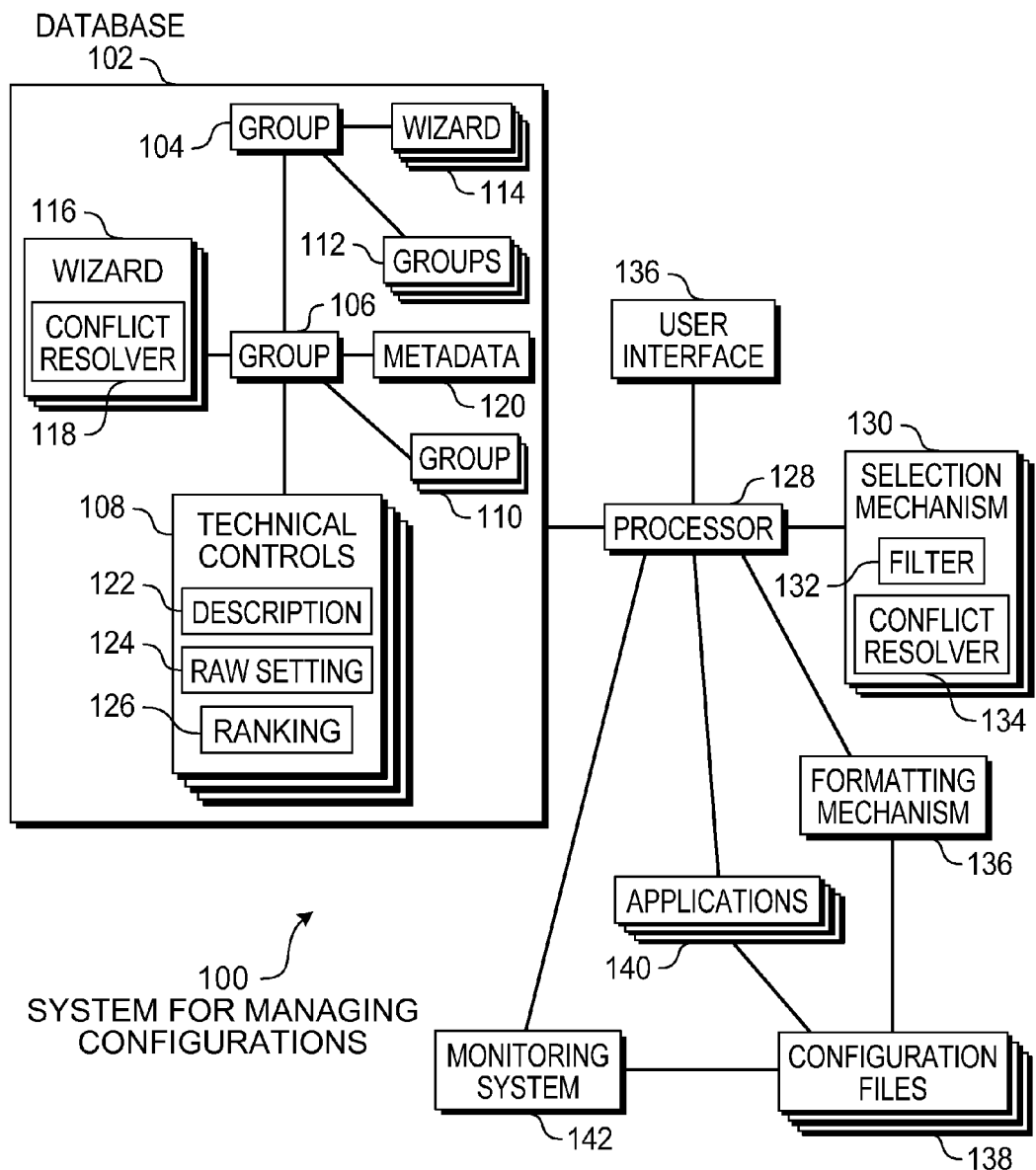
FIG. 1 is a diagram illustration of an embodiment showing a system for managing configurations.

A configuration management and monitoring system may determine values for a large number of technical controls or configuration settings. Configuration knowledge may be stored in a hierarchical database through which values for the technical controls may be obtained.

The hierarchical database may be defined using groups and subgroups of technical controls. Each group may define the values for a set of technical controls for a specific configuration. The configurations may be defined for an operating system, computer workload, security level, business or legal governance policies, regulatory compliance, or other grouping.

A user interface may guide a user through a process of selecting the appropriate groups. In some cases, the user interface may use a wizard or other sequential user interface. In embodiments that employ wizards, wizards may be stored within the hierarchical database and may be associated with specific groups or subgroups within the database.

When two or more selected groups may produce different values for a specific technical control, a conflict resolution mechanism may determine an appropriate value. In some embodiments, a heuristic or other algorithm may be used to select a value.

For conflict resolution, some embodiments may employ a ranking system where a technical control or group of technical controls may be defined with a rank value. In order to resolve a conflict, the value of a technical control that has the highest rank may be selected. Other embodiments may define a ranking where the lowest rank may be selected.

After gathering the technical controls, one or more configuration files may be generated. The configuration files may be used to configure individual applications, services, devices, or operating systems. In some cases, one or more configuration files may be used by a monitoring and compliance system to ensure that the technical controls are set in accordance with the configuration files.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, microcode, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for managing configurations. Embodiment 100 is a simplified example of a system that generates settings for multiple technical controls based on user input, and then assists implementation of those settings.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified example of a system for managing configuration. The embodiment illustrated may operate on a single device, such as a server computer or a client computer within a network environment, and may create configuration files or other consumable item to convey configuration settings for technical controls in applications, operating systems, services, hardware, or other configurable device or component.

In some embodiments, the functions of the configuration management system may be performed by a remote server and may be accessed over a remote interface, such as using Hyper Text Transport Protocol (HTTP). In such an embodiment, a user may access some or all of the functionality of the configuration management system through a web browser, where the functionality may be performed on a remote server accessed over the Internet. In some embodiments, the functions of the configuration management system may be performed by a server available within a local area network.

The configuration management system may produce consumable items for configurable devices. One example of a consumable item may be a configuration file that may be used by an application. When the application starts operation, the application may read the configuration file and operate with the settings found in the configuration file. Another example may be a configuration file that may be used by an installation script. In such an example, an application installation routine may use a configuration file as default settings when performing an installation. In still another example, a configuration file may be used by a configuration application to force changes in services, applications, or devices. Such changes may be made while the items are in operation or may be made so that the items will operate using the changes in the future.

A database 102 may be a hierarchical database that may be arranged using a top level group 104 and lower level groups 106 and 112. In many embodiments, a group 106 may be defined to have one or more subgroups 110. Some embodiments may have many levels defined by a group/subgroup hierarchy.

Each group may contain data for one or more technical controls. A technical control is a setting, variable, or other changeable or configurable element that may be used by a hardware or software component. In many embodiments, a technical control may be the lowest level or finest granularity of changeable items for the hardware or software component. In some embodiments, a single technical control may encompass several changeable items.

In embodiment 100, the group 106 may contain a set of technical controls 108, as well as subgroups 110 which may contain further technical controls.

The technical controls 108 may contain a description 122 and a raw setting 124. The description 122 may be a human readable or verbose description of a technical control 108, and may be used when presenting the technical control in a user interface. The raw setting 124 may be a value or setting for the technical control 108 in the group 106.

The technical controls may be arranged in groups that may be defined for a specific configuration. In a simple example, a group may be defined for a medium level of password protection. Within the group, a technical control for a minimum password length may be set to a raw setting of six characters, and a second technical control may be set to a raw setting of a minimum of one special character for the password. Another group may be defined for a high level of password protection. The second group may contain the same technical control for minimum password length, but with a raw setting of eight characters and the second technical control set to a raw setting of a minimum of two special characters.

In the example, two groups may be defined: one for a medium level of password protection and a second for a high level. Within each group, a set of technical controls may be defined with separate raw settings.

Continuing with the example, a third group may be defined for a low level of password protection. Such a group may contain a technical control for a minimum password length of six characters but may not contain the technical control for a minimum number of special characters.

The hierarchical database 102 may contain knowledge in the form of groups of technical controls with specific raw settings. In the example with the password groups above, a definition of password strength is defined by the raw settings of technical controls in each group.

In many embodiments, groups may be defined for many different configurations and may encapsulate best practices, standards conformance, or certain operational characteristics. Each group may define one aspect of a configuration.

For example, several groups may be defined for a mail server, where each group defines the mail server technical settings for different operating environments. One group may define technical settings for a mail server that is operated for a single company within a local area network, another may define technical settings for a mail server that is operated for a single company but handles external mail to the Internet, while a third group of technical settings may define a mail server that provides mail services to multiple companies or individuals through the Internet.

When configuring a mail server, as in the example, groups of technical settings may be created to define a mail storage mechanism, an authentication mechanism, an address or contact list manager, an incoming mail retriever, and an outgoing mail transfer system. Within each group, subgroups of technical settings may be organized.

In the mail server example, the knowledge of the mail server operation may be embodied in the groups defined for the different ways a mail server may be operated.

Groups may be defined for different workloads of a device. In the mail server example, the mail server may be considered a workload. Other examples of server workloads may be DNS services, DHCP services, directory services, firewall services, web services, and services for specific applications that execute on a server. A client device in a company network may have workloads for messaging clients, locally operating applications, network connectivity services, configuration management services, local anti-virus services, and other workloads.

Groups may be defined for different operating systems. Many different operating systems exist and, within each operating system, there may be many different versions of the operating system. Each version of each operating system may have specific technical controls that enable or disable certain features, allow the operating system to connect to a network, and enable the operating system to function in a desired manner. In many cases, one operating system may have a technical control that another operating system may not have.

Security groups may define different security related concepts. The password strength example above is one such group. Other security related groups may define which ports are open on a network connection, authentication methods, encryption settings, access time limitations, or other security goals or concepts. Other examples of security related groups may be technical controls for classified data as well as digital rights management systems and restrict access to patient or client data.

Groups may be defined for different functions that a device may perform. For example, a server device may provide messaging functions such as email and instant messaging, as well as authentication, data storage, and database operations. A network device may perform functions of a scanner and fax machine, while another device may perform an industrial machine control function.

Business governance policies may be incorporated into specific groups as well. For example, groups of technical controls may define document retention policies and may monitor or log access to sensitive financial data. Other business governance policies that may be implemented using technical controls may involve access to computer networks, including restricted access to sensitive or critical data such as human resources or accounting data.

Regulatory compliance may be enforced using groups of technical controls. For example, groups of technical controls may create audit trails, monitor or log access to patient or client data, or control access to classified data.

When generating a configuration, a typical embodiment may combine many different groups of technical controls. For example, a company server may have a group that defines password strength, a group that defines how a mail server is to be configured, plus additional groups that define user access privileges, a directory service, Internet connection settings, settings for distributed applications, and several other groups, including groups that may define a company's business governance and regulatory compliance.

When many different groups are combined, there may be many different values gathered for certain technical controls. For example, a standard configuration of a mail server may have a low setting for password strength, but a company business practice may define at least a medium strength password. When the standard mail configuration group of technical controls are selected along with the business practice of a medium strength password, there may be a conflict between the various password related technical controls. In such a case, a conflict resolution mechanism may determine which setting for the password related technical controls will be valid.

There are many different mechanisms for conflict resolution. In some cases, a wizard 116 may include a conflict resolver 118. The conflict resolver 118 may be a heuristic, algorithm, or other mechanism that selects one value for a technical control over another value.

One mechanism for determining a value for a technical control may be to compare the ranking 126 for each raw setting 124 of a technical control 108. The raw value may be selected by choosing the highest or lowest ranking value among the raw settings.

The hierarchical database 102 may have various wizards 114 and 116 at different levels within the hierarchical database 102. The wizards may be sequential user interfaces through which a user may answer questions or make selections that may be used to select appropriate groups of technical controls. Some wizards may be more complex than others.

For example, a simple wizard may present a choice of three different levels of default password security settings, such as Low, Medium, or High. The choices may correspond directly to a group of technical controls. In another example, a series of questions may be presented to a user that prompts a user through a decision tree that may result in selecting one of the three groups of technical controls for password security settings. In some such examples, the decision tree followed by a wizard may be represented by a portion of the hierarchy of groups and subgroups defined in the database 102.

The hierarchical database 102 may be used by a processor 128 that operates a selection mechanism 130. The selection mechanism 130 may contain a filter 132 and a conflict resolver 134. A user interface 136 may solicit input from a user that may be used to select technical controls and raw settings for the technical controls.

The selection mechanism 130 may receive input from the user interface 136. In many cases, one or more wizards may be presented on the user interface 136 to solicit user input. Other embodiments may have different mechanisms for receiving input from a user.

Based on the user input, a filter 132 may select the applicable groups of technical controls from the database 102. In many cases, multiple groups may be selected. The filter 132 may be find the groups based on direct input from a wizard, which may specify a particular group. In some cases, the filter 132 may search the database 102 to find groups that match certain criteria, where the criteria are received from the user interface 136, either by a wizard or some other prompt.

The filter 132 may aggregate and filter the groups of technical controls together to define a set of technical controls. In some cases, the filter 132 may remove some technical controls. Some groups may define the available controls for a particular operating system, application, or service and may be used to filter out or remove technical controls that are not applicable. Other groups may define a larger set of technical controls that may define, for example, a business governance policy.

For example, an operating system may have technical controls for setting a password length, but no technical controls for the complexity of the password, which may be defined in a general business policy group. In a case where both groups are selected, the filter 132 may filter out or remove those technical controls from the business governance policy that are not able to be implemented.

In many cases, the filter 132 may aggregate or combine technical controls from various groups. For example, a group may be selected that defines a configuration of a web browser application and another group may be selected that defines an instant messenger application. The two selected groups may have a very little, if any, overlapping technical controls and the filter 132 may produce a set of technical controls that is an aggregation or summation of the technical controls in both groups.

The conflict resolver 134 may resolve conflicts where a single technical control has two or more different raw settings or values based on the selected groups. In some cases, a raw setting may be a more restrictive setting, while in other cases, a raw setting may be a less restrictive setting. Depending on the circumstances, the conflict resolver 134 may select the more restrictive setting, while in other circumstances, the conflict resolver 134 may select the less restrictive setting.

The selection of a raw setting or value for a technical control may be made in many different manners. In some cases, a ranking value may be analyzed, while in other cases, a heuristic, algorithm, or other mechanism may be used to select the raw setting. In some cases, a ranking value may be attached to each individual technical control within a group. In other cases, ranking value may be attached to a group. Such a ranking value may be included in metadata 120 that is associated with a specific group or portions of a hierarchy.

After selecting the technical controls and raw values or settings for the technical controls, a formatting mechanism 136 may create one or more configuration files 138 that may be consumed by applications 140 or a monitoring system 142.

The configuration files 138 may be created for each application 140 that is affected by the configuration system. An application 140 may consume a configuration file during operation or installation. In some embodiments, the configuration file 138 may be a text file that contains settings used during startup of an application to configure certain settings. In some embodiments, the configuration file 138 may contain a script that is executed in a shell or by an application to affect a change. In some embodiments, one application 140 may be executed using a configuration file 138 to cause changes to another application 140. The formatting mechanism 136 may create the configuration files 138 in various manners, depending on the way the configuration file 138 will be consumed.

The monitoring system 142 may monitor the applications 140 or other devices for compliance with the technical control settings. In an enterprise network environment, a monitoring system 142 may monitor the configuration of servers, clients, and various devices across a network. In such an environment, the monitoring system 142 may use a configuration file 138 or set of configuration files 138 that define the configurations of specific devices within the enterprise, groups of devices that perform specific roles, or all of the devices. In some embodiments, the configuration files 138 may define technical controls that are common across multiple devices as well as technical controls that are specific to one or more devices.

The embodiment 100 may be implemented in several different fashions. In a locally operated embodiment, the functions of the selection mechanism 130 and formatting mechanism 136 may be performed on a local server device. In some cases, a locally operated embodiment may be used for selecting values for technical controls that are implemented on the same device or server on which the selection mechanism 130 and formatting mechanism 136 operate.

In some embodiments, the functionality of the selection mechanism 130 and formatting mechanism 136 may be performed on a remote server. In such an embodiment, a user interface 136 may be presented using HTTP on a web browser, and the configuration files 138 may be downloaded from the remote server. Such an embodiment may be useful for distributing configuration settings from a large database that may be continually maintained by a third party or by a software manufacturer, for example.

Figure 2:
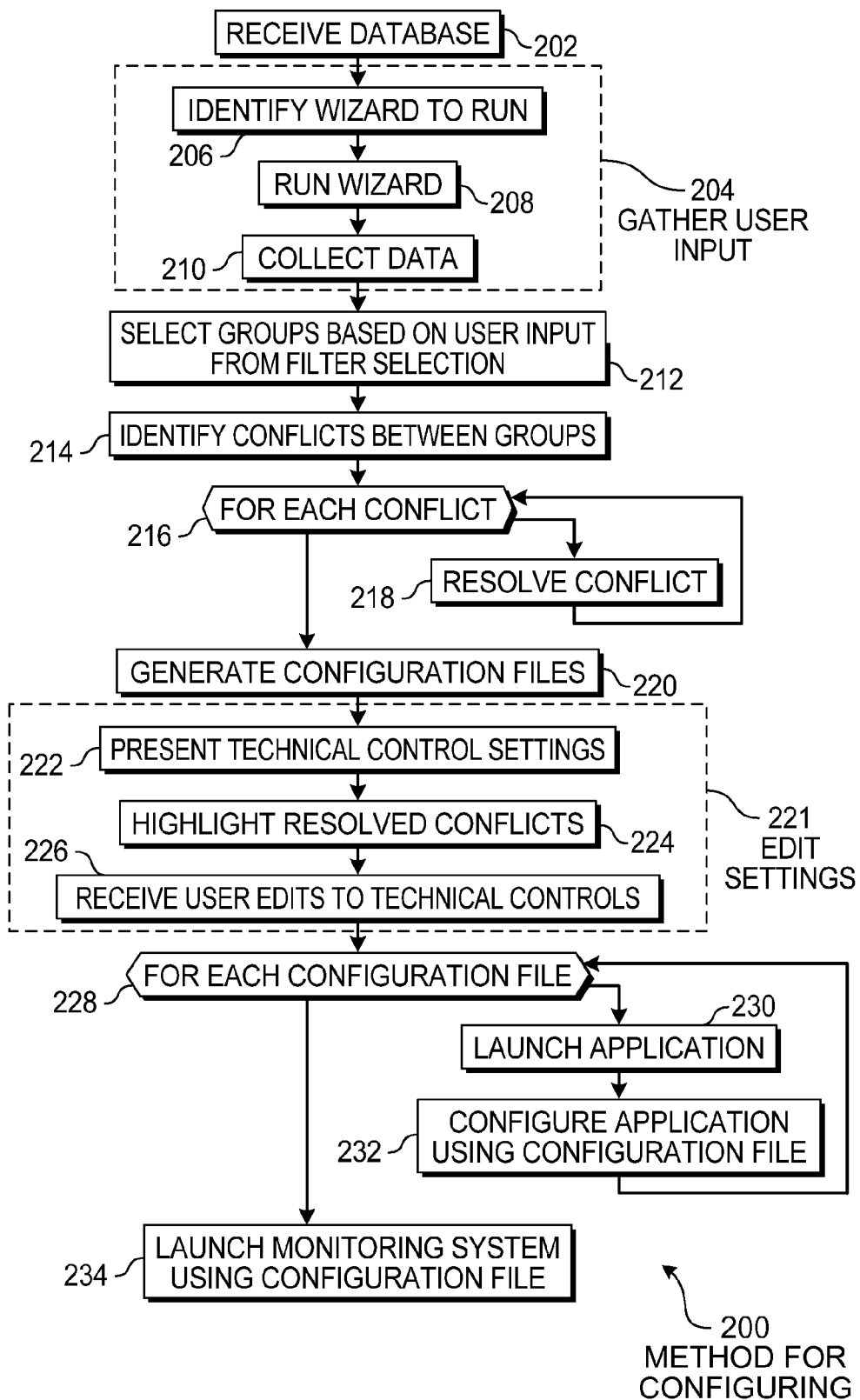
FIG. 2 is a flowchart illustration of an embodiment showing a method for selecting and managing a configuration.

FIG. 2 is a flowchart illustration of an embodiment 200 showing a method for managing configurations. Embodiment 200 is a simplified example of merely one method for performing the functions of a configuration management system as described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a high level process that may be performed by a configuration management system. In many embodiments, additional features, functions, or operations may be present.

In block 202, a database may be received. The database may be a hierarchical database as described in embodiment 100 as database 102. In many cases, the database may contain technical controls that are arranged in groups with specific raw settings for particular purposes, situations, and configurations of hardware and software components.

In many embodiments, the database may be arranged in a manner that may make soliciting user input easier. The hierarchical nature of a database, in some cases, may present a natural decision tree or search tree that may enable a user to traverse the database to identify groups of technical controls that are configured to meet the user's criteria. In some embodiments, the database may contain various metadata, wizards, or other information that may be used to create a user interface display and receive data.

In block 204, user input data may be gathered. Block 204 may represent one mechanism for soliciting user input, which uses predefined wizards. The wizards to run may be identified in block 206, executed in block 208, and data collected from the user in block 210.

In some cases, a high level wizard may be used to identify other wizards that may be run. In many embodiments, a wizard may be created to help a user select from among several groups of technical controls, while other wizards may help a user identify those selections that may be made. For example, a high level wizard may determine that a user is interested in installing a mail service on a remote server. The first wizard may identify and run a wizard that asks specific questions about different types of installations that may be performed, and subsequent wizards may solicit input that is used to select detailed sets of technical controls that match the user's desired configuration.

Other embodiments may have different manners for soliciting input. In some cases, a user input file may be created prior to executing the method of embodiment 200. Such a user input file may be read during block 204. In some such embodiments, a user input file may be stored after each time a wizard is executed, and the input file may be read each subsequent time. The user input file may be used to populate input fields of the wizards in some cases, and the user may be able to change or update the entry. In other cases, the user input file may be consumed by the wizard without giving the user an opportunity to change the settings.

Based on the user input received in block 204, groups of technical controls may be selected in block 212. In some cases, the groups may contain all possible technical controls for a specific type of feature, while other groups may be used as filters to remove those features that may not be applicable to a specific implementation.

For example, a filter group may define the available technical controls for a certain operating system or application, while several other groups may define large numbers of technical controls that may be applicable to many different operating systems or applications. The filter group may be used to remove the unused technical controls from the set of selected technical controls.

After the groups are selected in block 212, the technical controls within the groups may be analyzed to identify conflicts between groups in block 214. A conflict may be two or more raw settings of a technical control that may be defined for the technical control. In many cases, the conflicts may arise when the technical controls and their settings are combined from two or more groups.

For each conflict in block 216, the conflict may be resolved in block 218.

The conflict resolution mechanism used in block 218 may select a raw setting for a technical control using several different manners. In one mechanism, a heuristic may be defined that has a set of dependencies on which basis a particular raw setting is selected. Another mechanism may use a ranking associated with the technical control or a ranking associated with a group or subgroup of technical controls. The rankings of two different raw settings may be compared to select one of the raw settings. Other embodiments may have algorithms that are embedded in wizards or other mechanisms for selecting one raw setting over another.

After the conflicts are analyzed in block 216, configuration files may be generated in block 220.

In block 221, the raw settings for the technical controls may be edited in block 221. In some embodiments, the technical controls may be presented in a user interface in block 222, resolved conflicts may be highlighted in block 224, and a user may be able to edit the technical control settings in block 226.

In many cases, the hierarchical database may be used to generate recommended settings for a hardware or software component. Even though the recommended settings may be created by experts in the field and may be the result of a long history of experimentation, a user may have the option of changing the recommended settings to correspond with the particular implementation.

In some cases, the user may be given the opportunity to overwrite or change any given technical control. In other cases, the user may be given the opportunity to view, but not overwrite one or more of the settings. In still other cases, the user may not be presented with the opportunity to view or change a particular setting. In some cases, a user input may be overwritten by the setting determined from the database.

After the user edits are performed in block 221, the user edits may be stored in the configuration files.

For each configuration file in block 228, an application may be launched in block 230 and the application may be consumed by the application in block 232.

In block 232, the application may consume the configuration file in several different manners. In one case, the application may perform an installation routine that uses the configuration file as an input to options that are set during installation. In another case, an application may have already been installed but may execute using the configuration file as an input to set various configuration parameters.

In still another case, the application in block 232 may use a configuration file to implement a change on an operating system, hardware device, or other application or service. In such a case, the application in block 232 may be an installer or configuration application and not the application or component that is affected by the technical controls.

In some embodiments, the application in block 230 may be a locally operating application. For example, an embodiment may be implemented on a standalone device for configuring the hardware and software components of the device. In another embodiment, the application in block 230 may be a remotely operating application. An example may be where the embodiment may be implemented on a server device and the application in block 230 may be executed on a client device. Such an example may have the server located within a local area network, while another example may have the server located remotely and available over the Internet.

In some embodiments, the launching of the application in block 230 may be performed automatically by a processor that performs selecting and formatting. In other embodiments, the application in block 230 may be manually launched by a user on the same or a different device.

In block 234, a configuration monitoring system may be launched using the configuration file. In many cases, a configuration management system may be used to periodically monitor the status of a device or groups of devices. In some embodiments, a centralized monitoring and reporting system may determine the configuration of remote devices with or without the use of a monitoring client on each remote device.

When a configuration monitoring system is used, one or more configuration files may be used to compare actual settings to the settings defined in the configuration file.

In some cases, a technical control may be defined with different priorities, so that reporting by a configuration monitoring system may be more useful. An example of a priority may be to set high importance configuration settings so that the configuration monitoring system displays an urgent message when the technical control is not set properly. Such a setting may be used when the setting affects network security, for example. A low priority may be set to those technical controls that affect a non-critical component or where security is not breeched.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, a method for creating a configuration file for configuring an application to conform to specified configuration settings, the method comprising:

accessing a hierarchical database comprising a plurality of technical controls, each of said technical controls having a description and a raw setting, said technical controls being defined in a plurality of groups, the description being a human readable description of a corresponding technical control, the raw setting, the raw setting being a value for a corresponding technical control;

presenting at least one option within a user interface for soliciting user-input for selecting technical controls used to configure the application;

receiving user input selecting at least two of said plurality of groups for use in creating said configuration file, said at least two of said plurality of groups including a first group and a second group, said first group including a technical control and defining that a corresponding raw setting for said technical control is to have a first value, said second group also including said technical control and defining that said corresponding raw setting for said technical control is to have a second different value;

selecting a set of technical controls from said at least two of said groups for inclusion in said configuration, said set of technical controls representing configuration settings to which the application is to conform, said set of technical controls including said technical control;

identifying a conflict for said technical control based on said first group defining that said corresponding raw setting is to have a first value and said second group defining that said corresponding raw setting is to have said second different value;

selecting said first value for said technical control based on a conflict resolution criteria, said conflict resolution criteria being defined at a selection module; and formatting said set of technical controls, including said first value, into a configuration file, said configuration file consumable by said application to cause said application to conform to said configuration settings.

2. The method of claim 1, said application consuming said configuration file to configure said application to comply with said set of technical controls.

3. The method of claim 2, said set of technical controls being a subset of said at least two groups.

4. The method of claim 1, said application consuming said configuration file configure said application to monitor compliance with said technical controls.

5. The method of claim 1, said technical controls being used to monitor compliance for a plurality of devices.

6. The method of claim 1, said technical controls being used to monitor compliance for a plurality of applications.

7. The method of claim 1, said conflict resolution criteria being a ranking of said first value with respect to other values for said corresponding raw setting.

8. The method of claim 1, said conflict resolution criteria comprising one of: a heuristic defined within said hierarchical database or a wizard defined within said hierarchical database.

9. The method of claim 1, said at least one option being presented by a wizard.

10. The method of claim 9, said wizard being defined within said hierarchical database.

11. The method of claim 1, said hierarchical database comprising at least one set of groups of said technical controls being arranged by at least one of a group composed of:
device workload;
operating system;
security level;
device function;
business governance policies; and
regulatory compliance.

12. A system comprising:
a hierarchical database comprising a plurality of technical controls, each of said technical controls having a description and a raw setting, said technical controls being arranged in a plurality of groups, said groups being arranged in a hierarchical structure, at least one of said technical controls being contained in a first group and a second group of said plurality of groups, each of said first group and said second group having a different value for a raw setting for said at least one of said technical controls, said first group having a first value and said second group having a second value, each description being a human readable description of a corresponding technical control, each raw value being a value for a corresponding technical control;

a user interface configured to present information soliciting user-input for selecting technical controls used to configure an application;

a filter mechanism, said filtering mechanism configured to:
receive said user input for selecting technical controls used to configure said application;
select a set of groups, from among the plurality of groups, for use in creating a configuration for said application, said set of groups including said first group and said second group;
select a set of technical controls for inclusion in said configuration, said set of technical controls representing configuration settings to which the application is to conform, the set of technical controls including said at least one of said technical controls; and
for each of said technical controls, return a value for a corresponding raw setting;

a conflict resolution mechanism within said filter mechanism, said conflict resolution mechanism configured to:
identify a conflict for said at least one of said technical controls based on said first value and said second value for said corresponding raw value differing; and
select said first value as the value for said raw setting based on a conflict resolution criteria; and a formatting mechanism configured to create a consumable file in a format consumable by said application to cause said application to conform to said configuration settings.

13. The system of claim 12, said user interface being further configured to receive an identifier for a specific technical control, present said description on said user interface, and receive a specific setting for said specific technical control.

14. The system of claim 13, said specific setting being used to override a setting determined by said filter mechanism.

15. The system of claim 13, said specific setting being overridden by a setting determined by said filter mechanism.

16. The system of claim 15, said hierarchical database comprising an override parameter for said specific technical control.

17. The system of claim 12, said user interface being configured to present a wizard, said wizard defining said information and said user input, said wizard being defined in said hierarchical database.

18. A system comprising:
a hierarchical database comprising:
a plurality of technical controls, each of said technical controls having a description and a raw setting, said technical controls being arranged in a plurality of groups, said groups being arranged in a hierarchical structure, at least one of said technical controls being contained in a first group and a second group of said plurality of groups, each of said first group and said second group having a different value for a raw setting for said at least one of said technical controls, said first group having a first value and said second group having a second value, each description being a human readable description of a corresponding technical control, each raw value being a value for a corresponding technical control;

a set of wizards comprising displayable information and parameters to be received, said wizards further comprising a set of groups to be selected based on values of said parameters;

a selection mechanism configured to:

solicit user input selecting a set of groups as defined a first of said set of wizard, said set of groups for use in creating a configuration for a computer-related component, said set of groups including said first group and said second group;

identify a set of technical controls contained in said set of groups for inclusion in said configuration, said set of technical controls representing configuration settings to which an application is to conform, said set of technical controls including said at least one of said technical controls;

identify a conflict for said at least one of said technical controls based on said first value and said second value for said corresponding raw value differing;

resolve said one conflict using a ranking to select said first value as the value for the corresponding raw setting based on a conflict resolution criteria; and a presentation mechanism configured to create a configuration file in a format consumable by said application to cause said application to conform to said configuration settings.

19. The system of claim 18 further comprising:

a monitoring system configured to examine said technical controls in an application and determine if said technical controls in said application comply with said raw settings.

20. The system of claim 18, said configuration file being used by an application to configure said application using said raw settings.

* * * * *